(12) United States Patent
Sun

(10) Patent No.: US 12,165,071 B2
(45) Date of Patent: Dec. 10, 2024

(54) ARTIFICIAL INTELLIGENCE APPARATUS, SYSTEM AND BEHAVIOR CONTROL METHOD THEREOF

(71) Applicant: SHENZHEN TATFOOK WISDOM HEALTH TECHNOLOGY CO., LTD., Shenzhen (CN)

(72) Inventor: Shangchuan Sun, Shenzhen (CN)

(73) Assignee: SHENZHEN TATFOOK WISDOM HEALTH TECHNOLOGY CO., LTD., Shenzhen (CN)

( * ) Notice: Subject to any disclaimer, the term of this patent is extended or adjusted under 35 U.S.C. 154(b) by 1015 days.

(21) Appl. No.: 16/926,651

(22) Filed: Jul. 11, 2020

(65) Prior Publication Data
US 2020/0372374 A1 Nov. 26, 2020

Related U.S. Application Data

(63) Continuation of application No. PCT/CN2017/113917, filed on Nov. 30, 2017.

(30) Foreign Application Priority Data

Aug. 11, 2017 (WO) ............... PCT/CN2017/097172

(51) Int. Cl.
*G06N 5/02* (2023.01)
*G06F 16/176* (2019.01)
*H04L 9/40* (2022.01)

(52) U.S. Cl.
CPC ............ *G06N 5/02* (2013.01); *G06F 16/176* (2019.01); *H04L 63/101* (2013.01)

(58) Field of Classification Search
CPC ........... G06F 16/176; G06F 9/00; G06N 5/02; G06N 3/04; H04L 63/101
See application file for complete search history.

(56) References Cited

U.S. PATENT DOCUMENTS 6,773,344 B1 * 8/2004 Gabai .................. A63H 30/04
463/1
7,844,424 B2 * 11/2010 Comair .................. G06N 3/004
703/22

(Continued)

FOREIGN PATENT DOCUMENTS

CN         1911606 A     2/2007
CN       101377659 A     3/2009

(Continued)

OTHER PUBLICATIONS

Balch, Tucker, and Ronald C. Arkin. "Behavior-based formation control for multirobot teams." IEEE transactions on robotics and automation 14.6 (1998): 926-939. (Year: 1998).*

(Continued)

*Primary Examiner* — Randall K. Baldwin

(57) ABSTRACT

An embodiment of the present invention relates to the technical field of computing and discloses an artificial intelligence apparatus, a behavior control method and a system. The method includes: acquiring a behavior control instruction; parsing the behavior control instruction to obtain a behavior feature set sequence to be executed by the artificial intelligence apparatus; parsing the behavior control instruction to obtain a behavior feature set sequence to be executed by the artificial intelligence apparatus; and matching the behavior feature set sequence to be executed with data pre-stored in an ethical behavior control database, and controlling a behavior of the artificial intelligence apparatus according to a matching result.

19 Claims, 2 Drawing Sheets

(56) References Cited

U.S. PATENT DOCUMENTS

| | | | | |
|---|---|---|---|---|
| 2002/0169733 | A1* | 11/2002 | Peters, II | B25J 9/163 |
| | | | | 706/903 |
| 2007/0038332 | A1* | 2/2007 | Ozaki | G05D 1/0088 |
| | | | | 700/245 |
| 2017/0214701 | A1* | 7/2017 | Hasan | H04L 63/1433 |
| 2017/0274908 | A1* | 9/2017 | Huai | H04L 67/306 |

FOREIGN PATENT DOCUMENTS

| | | | | |
|---|---|---|---|---|
| CN | 101924762 | A | | 12/2010 |
| CN | 103078864 | A | | 5/2013 |
| CN | 104440925 | A | | 3/2015 |
| CN | 105072143 | A | | 11/2015 |
| CN | 105607518 | A | | 5/2016 |
| CN | 106325065 | A | | 1/2017 |
| CN | 106660209 | A | | 5/2017 |
| CN | 105072143 | B | * 11/2018 | ........... H04L 67/025 |
| JP | 2009012148 | A | | 1/2009 |

OTHER PUBLICATIONS

Dumitrache, Ion, Gabriela Simion, and Meda Truta. "Intelligent control system based on the brain model." Proceedings of the 2000 IEEE International Symposium on Intelligent Control. Held jointly with the 8th IEEE Mediterranean Conference on Control and Automation (Cat. No. 00CH37147). IEEE 2000:386-388 (Year: 2000).*

La Russa, Gaetano, Eugene N. Ageenko, and Yaroslav Karulin. "Fund raising systems using robots (architecture and behavior study)." 2005 International Symposium on Computational Intelligence in Robotics and Automation. IEEE, 2005: 525-530 (Year: 2005).*

Wang, Yingxu. "Cognitive robots." IEEE robotics & automation magazine 17.4 (2010): 54-62. (Year: 2010).*

Tan, Da-Peng, Shi-Ming Ji, and Ming-Sheng Jin. "Intelligent computer-aided instruction modeling and a method to optimize study strategies for parallel robot instruction." IEEE Transactions on Education 56.3 (2012): 268-273. (Year: 2012).*

Hibbard, Bill. "Ethical artificial intelligence." arXiv preprint arXiv:1411. 1373 v9 (2015): i-170 (Year: 2015).*

Chen, H. Lu Y. Li M., and H. Kim S. Serikawa. "Brain Intelligence: go beyond artificial intelligence Mob." Netw. Appl 23.2 (Jun. 2017): 368. (Year: 2017).*

Kim, Jong-Hwan, et al. "Intelligence technology for robots that think [application notes]." IEEE Computational Intelligence Magazine 8.3 (2013): 70-84. (Year: 2013).*

Kumar, Narendra, et al. "Ethical aspects and future of artificial intelligence." 2016 International Conference on Innovation and Challenges in Cyber Security (ICICCS-INBUSH). IEEE, 2016. (Year: 2016).*

Chinese First office action, 201780036242.8, mailed Aug. 17, 2022(11 pages).

International Search Report and Written Opinion for related International application No. PCT/CN2017/113917, mailed Apr. 20, 2018 (6 pages).

Long Gongsun, US plan to set ethics rules for military robots: Prevent them destroying the world, Digital Pioneer, Mar. 31, 2009.

Chinese Second office action, Application No. 201780036242.8, mailed Jan. 28, 2023(18 pages).

Journal of Changsha University, vol. 30, Issue 5; Sep. 30, 2016, Xu Daqing, Autonomous Robot Ethics; pp. 70-73, items 1-17.

Chinese Third Office Action,Chinese Application No. 201780036242. 8, mailed Jul. 29, 2023 (20 pages).

Chinese Fourth Office Action,Chinese Application No. 201780036242. 8, mailed Sep. 14, 2023 (18 pages).

Chinese Rejection decision,Application No. 201780036242. 8,mailed Dec. 19, 2023 (18 pages).

* cited by examiner

ARTIFICIAL INTELLIGENCE APPARATUS, SYSTEM AND BEHAVIOR CONTROL METHOD THEREOF

CROSS REFERENCE

The present application is a continuation-application of International (PCT) Patent Application No. PCT/CN2017/113917, filed on Nov. 30, 2017, which claims foreign priority to International (PCT) Patent Application No. PCT/CN2017/097172, filed on Aug. 11, 2017, the entire contents of which are hereby incorporated by reference in its entirety.

TECHNICAL FIELD

The present disclosure relates to the field of computer technologies, and in particular, to an artificial intelligence apparatus, a system, and a behavior control method thereof.

BACKGROUND

Artificial intelligence (AI) is a new technical science studying and developing theories, methods, techniques, and applications for simulating, extending, and expanding human intelligence. The artificial intelligence is a branch of computer science which attempts to understand the essence of intelligence and produce a new intelligent machine capable of responding in a manner similar to a human intelligence. Research in this area includes robotic, speech recognition, image recognition, natural language processing, expert system, etc. Since the official introduction of the artificial intelligence discipline in 1956, over the past 50 years, a great progress has been made. The artificial intelligence has become a broad cross-cutting and frontier science. Up to now, the development of the artificial intelligence has penetrated into many aspects of social life, liberating human beings from heavy physical strength, and at the same time gradually liberating human brain labor.

SUMMARY OF THE DISCLOSURE

An embodiment of the present disclosure provides a behavior control method for an artificial intelligence apparatus, the behavior control method including: obtaining a behavior control instruction; parsing the behavior control instruction to obtain a behavior feature set sequence to be executed by the artificial intelligence apparatus; matching the behavior feature set sequence to be executed with a pre-stored data in an ethical behavior control database, and controlling a behavior of the artificial intelligence apparatus according to a matching result.

Correspondingly, an embodiment of the present disclosure further provides an artificial intelligence apparatus, including: an input apparatus, an output apparatus, a memory, and a processor. The memory stores an ethical behavior control database and a program code. The processor is configured to invoke the program code to perform the behavior control method as described above.

Correspondingly, an embodiment of the present disclosure further provides an artificial intelligence control system, including the artificial intelligence apparatus as described above, and a server communicatively coupled to the artificial intelligence apparatus.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by one with ordinary skills in the art based on the embodiments of the present disclosure without creative efforts are within the scope of the present disclosure.

The terms of "first", "second", "third", "fourth", etc. (if present) in the specification, claims of the present disclosure and the above figures are for distinguishing similar objects, but not for describing a specific order. It is to be understood that a configured data may be interchanged as appropriate, such that the embodiments of the disclosure described herein can be implemented. For example, the technical solutions in the embodiments of the present disclosure may be implemented in a sequence other than those illustrated or described herein. In addition, the terms of "comprise", "include" and any deformation thereof are intended to cover a non-exclusive inclusion. For example, a process, a method, a system, a product, or an apparatus including a series of operations or units is not necessarily limited to the steps or units explicitly listed, rather may include other steps or units not explicitly listed or inherent to the process, the method, the product or the apparatus.

The embodiments of the present disclosure provide an artificial intelligence apparatus and a corresponding behavior control method, which will be specifically described.

Figure 1:
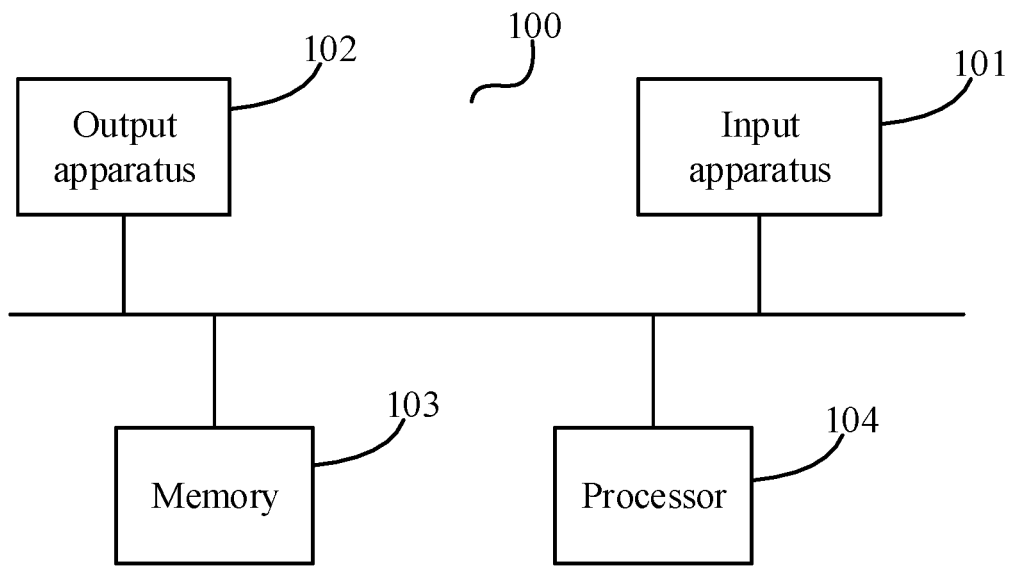
FIG. 1 is a structural schematic view of an artificial intelligence apparatus according to an embodiment of the present disclosure.

FIG. 1 illustrates an artificial intelligence apparatus 100. The artificial intelligence apparatus 100 may include an input apparatus 101, an output apparatus 102, a processor 104, and a memory 103. An ethical behavior control database is stored in the memory 103.

Figure 3:
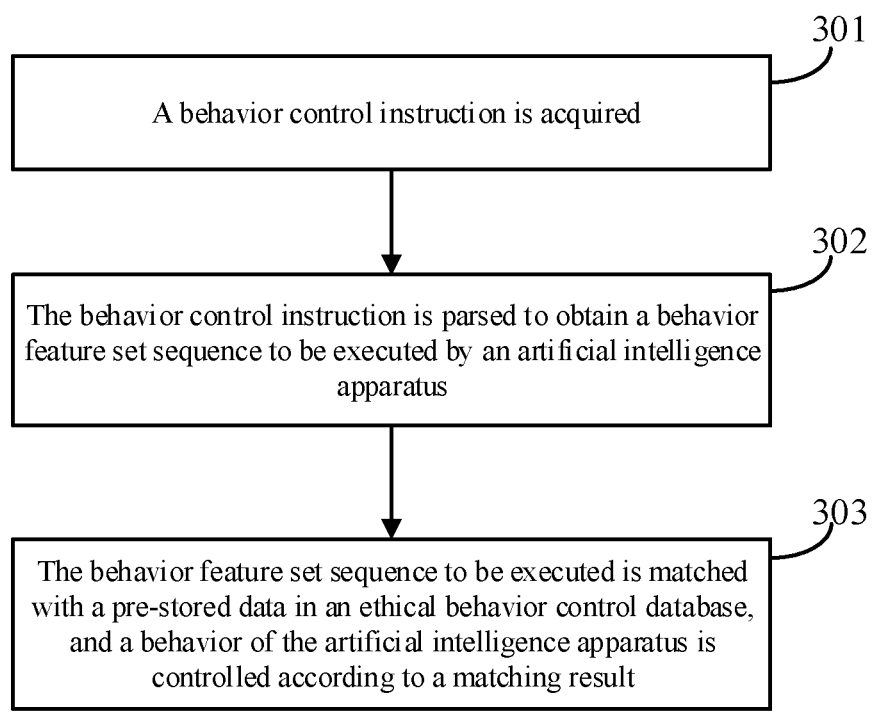
FIG. 3 is a flow chart of a behavior control method of an artificial intelligence apparatus according to an embodiment of the present disclosure.

A program code may also be stored in the memory 103. As shown in FIG. 3, the processor may call the program code and execute the following operations.

At block 301: A behavior control instruction is acquired.

The behavior control instruction received by the artificial intelligence apparatus 100 may be from a user. For example, the user sends the artificial intelligence apparatus 100 by means of a remote control apparatus, a human-machine interaction interface, a voice control, a body recognition (such as a gesture recognition), and the like.

The behavior control instruction may also be generated by the artificial intelligence apparatus 100 itself (such as an automatic response to the external environment), or from other artificial intelligence apparatuses or servers;

At block 302: The behavior control instruction is parsed to obtain a behavior feature set sequence to be executed by an artificial intelligence apparatus.

The behavior control instruction may include an explicit behavior feature set sequence to be executed. The behavior feature set sequence may include a behavior feature set composed of a plurality of behavior features and an execution timing of each behavior feature.

The behavior control instruction may also be a relatively fuzzy instruction. The artificial intelligence apparatus may analyze the behavior control instruction and formulate an execution plan capable of responding to the behavior control instruction. The execution plan is the behavior feature set sequence.

For example, the behavior feature set sequence may be a combination of any one or more of an operation, an action, a calculation, an input, an output, and the like to be performed by the artificial intelligence apparatus.

At block 303: The behavior feature set sequence to be executed is matched with a pre-stored data in an ethical behavior control database, and a behavior of the artificial intelligence apparatus is controlled according to a matching result.

The artificial intelligence apparatus provided in the embodiment pre-stores the ethical behavior control database in the apparatus, and standardize the behavior of the artificial intelligence apparatus through the ethical behavior control database, such that an operation or an action of the artificial intelligence apparatus is more reasonable, meeting requirements of users for the artificial intelligence apparatus.

Alternatively, the ethical behavior control database is a database of an artificial intelligence ethical system established on the principle of altruism.

For example, the ethical behavior control database may be a data pre-stored in the memory 104. The ethical behavior control database may include a plurality of behavior features. Alternatively, the plurality of behavior features may be divided into categories, for example, may be classified and stored separately according to Confucianism, Buddhism, Taoism, Medicine, Wu, Music, Custom, Science, Business, and etc.

Alternatively, the ethical behavior control database may be a read-only data stored in the memory 104, such that the ethical behavior control database may be not maliciously modified.

For example, the behavior feature set sequence includes a behavior feature set composed of a plurality of behavior characteristics and an execution timing of each behavior feature. The execution timing includes an execution sequence and a time interval.

For example, the behavior feature includes at least one or more of an action feature, a data calculation feature, a data input feature, and a data output control feature.

For example, the ethical behavior control database may include a whitelist and/or a blacklist. The whitelist includes a plurality of behavior feature samples allowed to be executed. The blacklist includes a plurality of behavior feature samples not allowed to be executed.

After the artificial intelligence apparatus parses the behavior control instruction, and acquires the behavior feature set sequence to be executed, the processor 104 may process the ethical behavior control data to match the behavior feature set, and control the behavior of the artificial intelligence apparatus according to the matching result. The matching method may include as follows.

A plurality of behavior features included in the behavior feature set are matched with a plurality of behavior feature samples allowed to be performed (whitelist), respectively, to obtain a first comprehensive matching degree;

Whether the first comprehensive matching degree is higher than a first predetermined threshold is determined. If a result is yes, the matching result is that the artificial intelligence apparatus is allowed to execute the to-be-executed behavior feature set sequence.

For example, the first comprehensive matching degree may be an average value or a weighted average value or a minimum value of the matching degrees of the plurality of behavior features.

Alternatively, if the matching result is that the artificial intelligence apparatus is allowed to execute the to-be-executed behavior feature set sequence, the behavior feature set sequence may be stored as a behavior feature sample allowed to be executed in the ethical behavior control database, that is, stored in the whitelist.

The specific matching method may further include as follows.

A plurality of behavioral features included in the behavior feature set are matched with a plurality of behavioral feature samples not allowed to be performed (blacklist), respectively, to obtain a second comprehensive matching degree;

Whether the second comprehensive matching degree is higher than a second predetermined threshold is determined. If a result is yes, the matching result is that the artificial intelligence apparatus is not allowed to execute the to-be-executed behavior feature set sequence.

For example, the second comprehensive matching degree may be an average value or a weighted average value or a maximum value of the matching degrees of the plurality of behavior features.

Alternatively, if the matching result is that the artificial intelligence apparatus is not allowed to execute the to-be-executed behavior feature set sequence, the behavior feature set sequence may be stored as a behavior feature sample not allowed to be executed in the ethical behavior control database, that is, stored in the blacklist.

Alternatively, in the matching process, the behavior feature, the type, and the execution timing included in the behavior feature set sequence are matched with the behavior feature, the type, and the execution timing of the behavior feature samples in the whitelist and/or the blacklist.

Alternatively, if the behavior features are stored according to the type, a batch of samples with same or similar behavior feature type among the plurality of behavior feature samples allowed to be executed according to the type of the behavior feature may be selected to be matched in the matching process. In such a way, a matching range is narrowed and a matching speed is increased.

Alternatively, the matching method may further include as follows.

The behavior feature set sequence is uploaded to a server. The server may store an ethical behavior control database with a large amount of data. The server matches the behavior feature set sequence with the stored ethical behavior control database after receiving the behavior feature set sequence uploaded by the apparatus, such that a matching result is acquired.

The matching result fed back by the server is received, and the behavior of the artificial intelligence apparatus is controlled according to the matching result fed back by the server.

Since the amount of data stored in the server may be larger than that of data stored in the apparatus, the matching result is more accurate.

For example, the artificial intelligence apparatus 100 may be a mobile phone, a computer, an intelligent robot, or other apparatus with data analysis and processing capabilities. The following is an example of an intelligent robot.

The ethical behavior control data is stored in the memory of the intelligent robot. In an embodiment, the ethical behavior control data is a read-only data that is solidified in the memory of the robot, such that the ethical behavior control data may not be maliciously modified. In another embodiment, the intelligent robot may have a self-learning function and independently update and correct the ethical behavior control data by means of the self-learning function.

According to different purposes, the intelligent robot may be classified into different categories and have different functions. For example, home robots may have functions such as moving, grabbing/handling articles, and voice dialogue. Industrial robots may be configured with a corresponding function such as welding, handling, painting, grinding, palletizing, assembly, according to different purposes. Military robots may have a function of complex terrain movement, load-bearing, mine-clearing, shooting, etc.

All intelligent robots as described above may perform a variety of heavy work that humans are unable to do. However, in the course of working, the robot often faces some complicated or unexpected situations. For complex or unexpected situations, at least two processing methods may be designed. The robot stops working and waits for instructions from the human user. This processing method is more secure, but obviously causing a delay in the robot work and wasting the processing power of the robot. Alternatively, the robot is given a certain autonomic processing authority, to react to the complex or unexpected situations, and perform appropriate operations or actions to deal with the situations. However, a risk is that: the handling of the robot against the complex or unexpected situations may not be consistent with the expectations of human users, and may even lead to extremely negative consequences.

In the solution provided by the embodiment of the present disclosure, the ethical behavior control data may be pre-stored in the memory of the intelligent robot. When the robot faces a complex or unexpected situation, the generated processing scheme (i.e., the behavior to be performed) is required to be matched through the ethical behavior control data. The processing scheme is executed only when the matching result is that the processing scheme is executed. The ethical behavior control data is defined by human users. Behaviors that humans think are reasonable are added in the whitelist. Behaviors that humans think are unreasonable are added in the blacklist. As long as the content of the behavior control data is reasonable, the processing strategy of the intelligent robot with certain autonomous processing ability in the face of complex or unexpected situations can be controlled, limiting the negative consequences caused by the unreasonable response of the robot.

Figure 2:
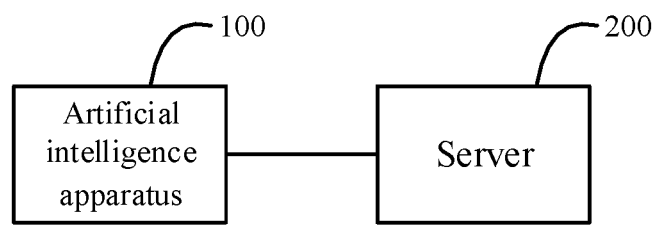
FIG. 2 is a structural schematic view of a behavior control system of an artificial intelligence apparatus according to an embodiment of the present disclosure.

As shown in FIG. 2, an embodiment of the present disclosure further provides an artificial intelligence control system, including the artificial intelligence apparatus 100 and the server 200 described above. The server 200 communicates with the artificial intelligence apparatus 100 in a wired or wireless manner, such as through an internet connection. The server 200 may be deployed in the cloud, where a behavior control database is stored. The behavior control database includes an amount of behavior control data, and can be continuously updated.

The behavior control data stored in the memory of the artificial intelligence apparatus may have a limited amount of data, and the matching result of the behavior feature set sequence may thus not be accurate enough. The embodiment of the present disclosure further provides the scheme for interactively matching with the server, as described above, such that the artificial intelligence apparatus may upload the behavior feature set sequence to be executed to the server. The matching result fed back by the server may be then received to make a more accurate determination. Since the server can store an amount of behavior control data, and the data is continuously supplemented and corrected, the server can determine the behavior feature set sequence more reliably and accurately. In such a way, the artificial intelligence apparatus can determine whether the behavior feature set sequence is executable more accurately, based on the matching result fed back by the server.

"Alternatively, the artificial intelligence apparatus performs a weighted averaging processing on the local matching result and the matching result fed back by the server, to obtain a more optimized matching result to obtain an optimized matching result. If the matching of the server is considered to be more reliable, a higher weight can be given to the match results fed back by the server."

In addition, an embodiment of the present disclosure further provides a computer readable storage medium storing a program, the program being executable to implement the behavior control method of the artificial intelligence apparatus as described above.

It should be noted that the above embodiments are all in the same inventive concept, and the descriptions of the respective embodiments are different. Details not described in the specific embodiments may be referred to the descriptions in other embodiments.

Those with ordinary skills in the art can understand that all or part of the steps of the foregoing embodiments can be completed by a program to instruct a related hardware. The program can be stored in a computer readable storage medium. The storage medium may include: a flash disk, a read-only memory (ROM), a random access memory (RAM), a disk, an optical disk, or etc.

The artificial intelligence apparatus, the behavior control method and the system provided by the embodiments of the present disclosure are described in detail above. The principles and implementation manners of the present disclosure are described in the specific examples. The description of the above embodiments is only used to help understanding the method of the present disclosure and the core idea. For those skilled in the art, according to the idea of the present disclosure, there will be changes in the specific implementation manner and the scope of application. In summary, the contents of the specification should not be construed as a limitation of the present invention.

What is claimed is:

1. A behavior control method, performed by an artificial intelligence apparatus, the behavior control method comprising:
    obtaining a behavior control instruction;
    parsing the behavior control instruction to obtain a behavior feature set sequence to be executed by the artificial intelligence apparatus, the behavior feature set sequence is a combination of any one or more of an operation, an action, a calculation, an input, and an output to be performed by the artificial intelligence apparatus;
    matching a data of the behavior feature set sequence to be executed with a pre-stored data in an ethical behavior control database, and controlling a behavior of the artificial intelligence apparatus according to a matching result, wherein in response to the matching result being that the artificial intelligence apparatus is allowed to execute the to-be-executed behavior feature set sequence, controlling the artificial intelligence apparatus to execute the to-be-executed behavior feature set sequence;

wherein the ethical behavior control database comprises a whitelist, comprising a plurality of behavior feature samples allowed to be executed; and the matching the data of the behavior feature set sequence to be executed with the pre-stored data in the ethical behavior control database comprises:

matching the plurality of behavior features with the plurality of behavior feature samples allowed to be executed, to obtain a first comprehensive matching degree; and the controlling the behavior of the artificial intelligence apparatus according to the matching result comprises:

determining whether the first comprehensive matching degree is higher than a first predetermined threshold; and in response to the first comprehensive matching degree being higher than the first predetermined threshold, the artificial intelligence apparatus being allowed to execute the behavior feature set sequence to be executed.

2. The behavior control method according claim 1, wherein the ethical behavior control database is a database of an artificial intelligence ethical system established on a principle of altruism.

3. The behavior control method according to claim 1, wherein the behavior feature set sequence comprises a behavior feature set composed of a plurality of behavior features and an execution timing of each of the plurality of behavior features.

4. The behavior control method according to claim 3, wherein each of the plurality of behavior features comprises at least one or more of an action feature, a data calculation feature, a data input feature, and a data output control feature.

5. The behavior control method of claim 3, wherein the execution timing of each of the plurality of behavior features comprises an execution sequence and a time interval.

6. The behavior control method according to claim 1, wherein the ethical behavior control database comprises a blacklist, comprising a plurality of behavior feature samples not allowed to be executed;

the matching the data of the behavior feature set sequence to be executed with the pre-stored data in the ethical behavior control database comprises:

matching the plurality of behavior features with the plurality of behavior feature samples not allowed to be executed, to obtain a second comprehensive matching degree; and the controlling the behavior of the artificial intelligence apparatus according to the matching result comprises:

determining whether the second comprehensive matching degree is higher than a second predetermined threshold; and in response to the second comprehensive matching degree being higher than the second predetermined threshold, the artificial intelligence apparatus being not allowed to execute the behavior feature set sequence to be executed.

7. The behavior control method according to claim 6, wherein the first comprehensive matching degree and the second comprehensive matching degree are each an average value or a weighted average value or a minimum value of the matching degrees of the plurality of behavior features.

8. The behavior control method according to claim 6, wherein in response to the artificial intelligence apparatus being not allowed to execute the behavior feature set sequence to be executed, the behavior feature set sequence to be executed is stored as a new behavior feature sample not allowed to be executed in the ethical behavior control database.

9. The behavior control method according to claim 1, wherein in response to the artificial intelligence apparatus being allowed to execute the behavior feature set sequence to be executed, the behavior feature set sequence to be executed is stored as a new behavior feature sample allowed to be executed in the ethical behavior control database.

10. The behavior control method according to claim 1, wherein the plurality of behavioral feature samples are stored in a classification manner according to a type of the behavior feature;

the matching the plurality of behavior features with the plurality of behavior feature samples allowed to be executed comprises:

matching the behavior feature, the type, and the execution timing included in the behavior feature set sequence with the behavior feature, the type, and the execution timing of the behavior feature samples allowed to be executed.

11. The behavior control method according to claim 10, wherein the matching the behavior feature, the type, and the execution timing included in the behavior feature set sequence with the behavior feature, the type, and the execution timing of the behavior feature samples allowed to be executed comprises:

selecting a batch of samples to obtain a selected batch of samples with a same or similar behavior feature type among the plurality of behavior feature samples allowed to be executed according to the type of the behavior feature, and matching the behavior feature, the type, and the execution timing included in the behavior feature set sequence with the selected batch of samples.

12. The behavior control method of claim 1 wherein the obtaining the behavior control instruction comprises:

receiving the behavior control instruction input by a user; or, acquiring the behavior control instruction generated by the artificial intelligence apparatus independently; or receiving the behavior control instruction sent by another artificial intelligence apparatus; or receiving the behavior control instruction sent by a server.

13. The behavior control method according to claim 1, wherein the pre-stored data in the ethical behavior control database is a read-only data.

14. The behavior control method according to claim 1, further comprising: uploading the behavior feature set sequence to a server;

receiving the matching result fed back by the server, and controlling the behavior of the artificial intelligence apparatus according to a matching result fed back by the server.

15. An artificial intelligence apparatus, comprising: an input apparatus, an output apparatus, a memory, and a processor, wherein the memory stores an ethical behavior control database and a program code; the processor is configured to invoke the program code to perform a behavior control method comprising:

obtaining a behavior control instruction;

parsing the behavior control instruction to obtain a behavior feature set sequence to be executed by the artificial intelligence apparatus, wherein the behavior feature set sequence is a combination of any one or more of an operation, an action, a calculation, an input, and an output to be performed by the artificial intelligence apparatus;

matching a data of the behavior feature set sequence to be executed with a pre-stored data in the ethical behavior control database, and controlling a behavior of the artificial intelligence apparatus according to a matching result, wherein in response to the matching result being that the artificial intelligence apparatus is allowed to execute the to-be-executed behavior feature set sequence, controlling the artificial intelligence apparatus to execute the to-be-executed behavior feature set sequence;

wherein the ethical behavior control database comprises a whitelist, comprising a plurality of behavior feature samples allowed to be executed; and the matching the data of the behavior feature set sequence to be executed with the pre-stored data in the ethical behavior control database comprises:

matching the plurality of behavior features with the plurality of behavior feature samples allowed to be executed, to obtain a first comprehensive matching degree; and the controlling the behavior of the artificial intelligence apparatus according to the matching result comprises:

determining whether the first comprehensive matching degree is higher than a first predetermined threshold; in response to the first comprehensive matching degree being higher than the first predetermined threshold, the artificial intelligence apparatus being allowed to execute the behavior feature set sequence to be executed.

16. The artificial intelligence apparatus according to claim 15, wherein the artificial intelligence apparatus performs a weighted averaging processing on a local matching result and another matching result fed back by a server, to obtain an optimized matching result, and the artificial intelligence apparatus is communicatively coupled to the server.

17. The artificial intelligence apparatus according to claim 16, wherein in response to a matching of the server being determined to be reliable, a higher weight is given to the another matching result fed back by the server.

18. An artificial intelligence control system, comprising a server and an artificial intelligence apparatus communicatively coupled to the server, the artificial intelligence apparatus comprising: an input apparatus, an output apparatus, a memory, and a processor, wherein the memory stores an ethical behavior control database and a program code; the processor is configured to invoke the program code to perform a behavior control method comprising:

obtaining a behavior control instruction;

parsing the behavior control instruction to obtain a behavior feature set sequence to be executed by the artificial intelligence apparatus; wherein the behavior feature set sequence is a combination of any one or more of an operation, an action, a calculation, an input, and an output to be performed by the artificial intelligence apparatus;

matching a data of the behavior feature set sequence to be executed with a pre-stored data in the ethical behavior control database, and controlling a behavior of the artificial intelligence apparatus according to a matching result, wherein in response to the matching result being that the artificial intelligence apparatus is allowed to execute the to-be-executed behavior feature set sequence, controlling the artificial intelligence apparatus to execute the to-be-executed behavior feature set sequence;

wherein the ethical behavior control database comprises a whitelist, comprising a plurality of behavior feature samples allowed to be executed; and the matching the data of the behavior feature set sequence to be executed with the pre-stored data in the ethical behavior control database comprises:

matching the plurality of behavior features with the plurality of behavior feature samples allowed to be executed, to obtain a first comprehensive matching degree; and the controlling the behavior of the artificial intelligence apparatus according to the matching result comprises:

determining whether the first comprehensive matching degree is higher than a first predetermined threshold; in response to the first comprehensive matching degree being higher than the first predetermined threshold, the artificial intelligence apparatus being allowed to execute the behavior feature set sequence to be executed.

19. The artificial intelligence control system according to claim 18, wherein the server is deployed in a cloud; and the ethical behavior control database is stored in the server; the ethical behavior control database comprises an amount of behavior control data and is continuously updated.

* * * * *